Nov. 5, 1940.          C. C. STRANGE          2,220,131
LOCKING MECHANISM
Filed March 17, 1938
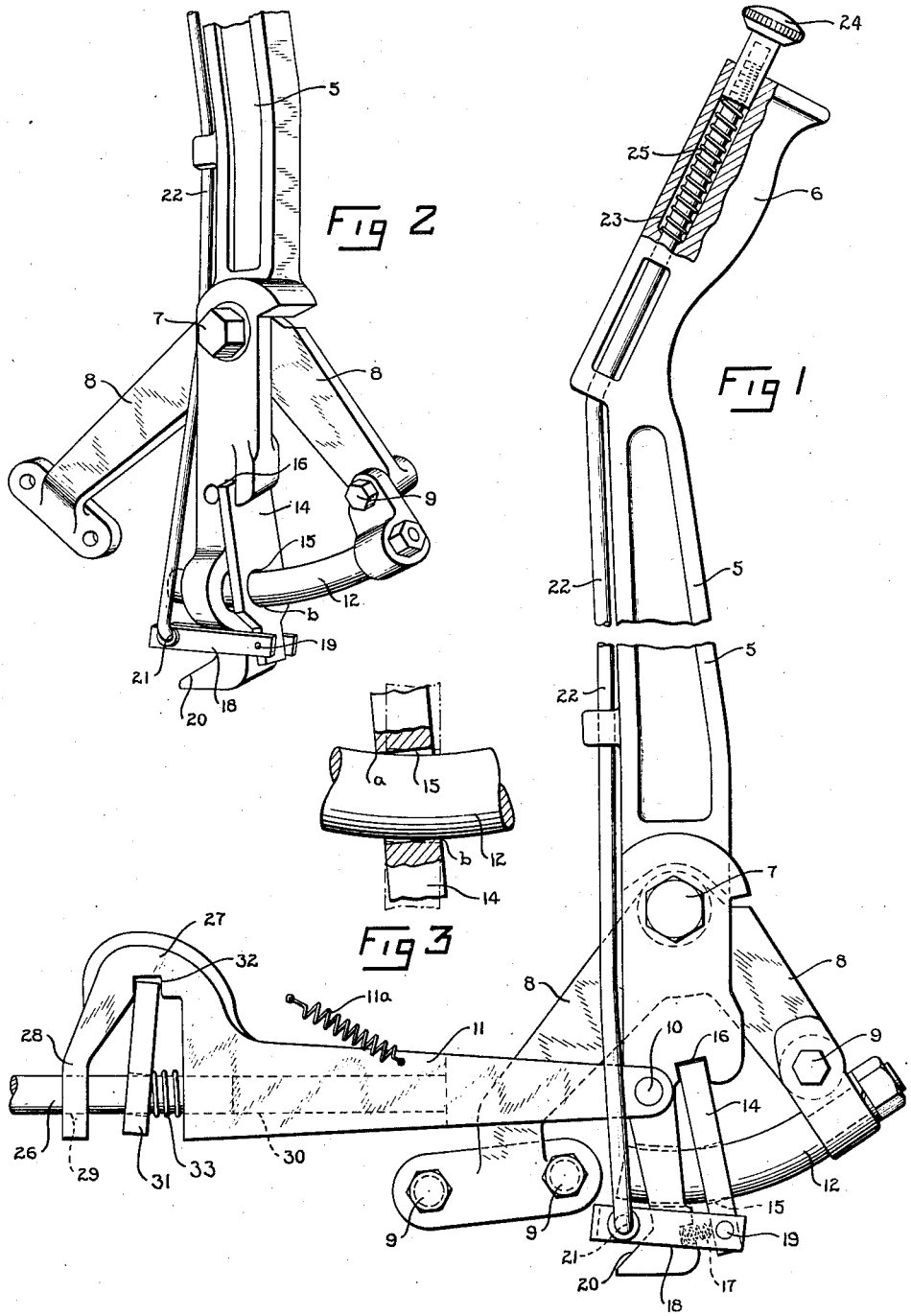
INVENTOR.
Charles C. Strange
BY F. Bascom Smith
ATTORNEY.

Patented Nov. 5, 1940

2,220,131

UNITED STATES PATENT OFFICE 2,220,131

LOCKING MECHANISM

Charles C. Strange, Port Richmond, Staten Island, N. Y., assignor of twenty-six and one-fourth per cent to Eric J. Pilblad, Rockville Centre, Long Island, N. Y., seventeen and one-half per cent to Alan J. McIntosh, seventeen and one-half per cent to Alvan L. Barach, and twelve and one-half per cent to Edmund J. Barach, all of New York, N. Y.

Application March 17, 1938, Serial No. 196,347

12 Claims. (Cl. 74—531)

This invention relates to locking mechanism and more particularly to the combination therewith of control means for applying and releasing the same.

One of the objects of the present invention is to provide novel means for effecting and controlling the application and release of locking apparatus adapted for holding an element against movement in at least one direction.

Another object of the invention is to provide novel means in combination with friction locking means whereby the latter may be quickly and easily released when the operator so wills.

Still another object is to provide novel apparatus whereby a member which is under a tension tending to move the same in one direction, such as an element of the brake mechanism of a vehicle when the brakes are in applied position, may be readily moved to and held at any desired point within the range of movement thereof, whereby maximum braking pressure is insured and the possibility of accidental release of the brakes is substantially eliminated.

A further object is to provide novel means in the brake applying mechanism of a vehicle which are adapted to automatically compensate for wear of the braking system.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention, reference for this latter purpose being primarily had to the appended claims.

In the drawing, wherein like reference characters refer to like parts throughout the several views, Fig. 1 is a side elevation, partly in section and with parts broken away, illustrating one form of the present invention;

Fig. 2 is an isometric view, with parts broken away, of a portion of the mechanism of Fig. 1; and, Fig. 3 is a detail view, partly in section and with parts broken away, illustrating two positions of the locking mechanism.

A single embodiment of the invention is illustrated in the drawing, by way of example, in a form adapted for use in applying and releasing the brakes of a vehicle and for automatically compensating the brake applying mechanism for any wear thereof. The locking mechanism employed for holding the brakes in applied position is of the friction type and is so constructed as to permit application of the brakes to the fullest and exact extent desired and to hold the brakes in such applied position. Said mechcanism is automatic in operation after movement thereof in brake applying direction and is so constituted that negligible, if any, back lash is permitted when the brake applying force is released. Novel means are associated with said locking mechanism whereby the latter may be readily released by the operator of the vehicle with the exertion of a comparatively slight force or effort and whereby any slack or play in the braking mechanism due to wear of the braking surfaces is compensated for automatically and continuously during operation.

In the illustrated embodiment of the invention, a lever 5 provided with a handle 6 is pivoted intermediate its ends on a pivot pin or bolt 7 at the vertex of an inverted, V-shaped supporting bracket 8 which is, in turn, rigidly secured at a plurality of points 9 to a fixed part of a vehicle chassis (not shown). Bracket 8 is preferably mounted below the floorboards of the vehicle and lever 5 extends upwardly through said boards in the usual, well-known manner in a position to be readily grasped by the driver. By means of a pin 10 intermediate pivot 7 and the lower end of lever 5, the latter is pivotally connected to an element 11 which, in turn, is connected to the vehicle brakes in a novel manner to be hereinafter described and is accordingly normally urged to the left, as viewed in Fig. 1, by the usual springs (not shown) employed for holding the brakes in released position. A spring 11a may also be provided for urging member 11 in brake releasing direction.

Rigidly mounted on the outer end of one of the arms of supporting bracket 8 and constituting an element of the locking mechanism is an arcuate rod 12 which is preferably circular in cross section. Said rod extends substantially across the open end of said bracket and freely through an opening provided in lever 5 below brake rod connection 10. The center of curvature of rod 12 is preferably substantially coincident with pivotal axis 7 of lever 5, thereby permitting angular movement of the latter without interference between the rod and portions of the lever adjacent the same.

It will be understood that, when lever 5 is moved in a counter-clockwise direction, element 11 will be moved to the right, as viewed in the drawing, for applying the vehicle brakes or against some other yielding force, such as spring 11a, depending upon the use to which the invention is put. For the purpose of holding said lever or element, and hence the brakes, in any desired applied position within the range of movement thereof, a locking element 14 which is adapted to cooperate with rod 12 and is novelly associated with lever 5 is provided. Said locking element, in the form shown, is constituted by a comparatively flat plate of metal having an opening 15 therein that is slightly larger than rod 12 and adapted to slidably receive the latter. The diameters of opening 15 and rod 12 are such that when plate 14 is perpendicular to the axis of the rod, as seen in dotted lines in Fig. 3, said plate will be free for movement relative to the rod in either direction. When, however, the locking plate is tilted in a counter-clockwise direction, as shown in full lines in Fig. 3, the edges *a* and *b* of opening 15 tend to bite rod 12 and frictionally hold said locking plate against movement toward the left, as viewed in the drawing.

In order to render locking element 14 operative by operation of lever 5 and effective to hold member 11 against movement toward the left and hence to hold the brakes in applied position, the upper end of said element fits loosely into a laterally extending recess 16 formed in lever 5 and is thereby fulcrumed at a point on the latter adjacent pivotal connection 10. Recess 16 is sufficiently large to permit plate 14 to be pivoted or tilted with the walls of said recess as a fulcrum to locking position relative to rod 12 and suitable resilient means, such as a spring 17, is interposed between said plate and lever adjacent the lower ends thereof whereby said plate is normally held in tilted or locking position with respect to rod 12.

Novel means are provided whereby the locking element may be readily and easily moved to and manually held in released position, to thereby permit movement of the brakes to released position, said novel means, in the form shown, comprising a U-shaped element or link 18 pivotally connected at 19 to the lower end of plate 14 and extending around the lower enlarged end of lever 5 which is provided with an angular or cam surface 20 for a purpose to hereinafter appear. The free end of link 18 is pivotally connected to a laterally projecting portion 21 at the lower end of a rod 22 which has a slight degree of flexibility and extends upwardly along lever 5 and slidably through an opening 23 in handle 6. The upper end of rod 22 is provided with a thumb button 24 which is threadedly secured thereto, and a spring 25 housed in an enlarged portion of opening 23 is provided for normally holding rod 22 in raised position. Parts of the releasing means above described are so arranged that, when rod 22 is pushed downwardly by the application of pressure to button 24, laterally projecting portion 21 of said rod engages angular surface 20 of lever 5 and movement of said portion along said surface is effective through link 18 to pull the lower end of member 14 toward the left against the effort of spring 17 and hence release the locking action between the locking member and rod 12.

In order to take up any slack in the brake applying mechanism and hence compensate for wear on the parts thereof, the outer end of member 11 is connected to brake rod 26 in a novel manner. As shown, member 11 has a U-shaped extension at the outer end thereof comprising portions 27 and 28 and said member and portion 28 have aligned openings 29 and 30, respectively, for slidably receiving brake rod 26. The latter also slidably extends through an opening in a locking element 31 which is similar to and functions in the same manner as locking plate 14. Element 31 is pivoted at its upper end in a slot 32 in portion 27 and is normally held in locking or gripping position relative to brake rod 26 by a spring 33 to thereby prevent movement of member 11 toward the right relative to the brake rod without materially hindering relative movement of said parts in the opposite direction. Thus, when lever 5 is moved in a clockwise direction to release the brakes, member 11 may move toward the left relative to rod 26 and thus take up any play in the connections between member 11 and the brake shoes. It will, of course, be understood that brake rod 26 may be directly connected to lever 5 at pivot 10 if desired.

When it is desired to apply the brakes and lock the same in applied position with the above-described mechanism, the operator grasps handle 6 and exerts a pull thereon to pivot lever 5 in a counter-clockwise direction, as viewed in the drawing, either with or without depressing button 24. This movement of lever 5 is effective to move member 11 and hence to move the braking system through lock 26, 31 in brake applying direction and also to slightly pivot element 14 in a counter-clockwise direction about point 19 and hence permit free movement of said element along rod 12. When the brakes have been applied to the desired extent, button 24, if the same has been depressed, and handle 6 are successively released by the operator, and element 14, which is normally held in locking position by spring 17, immediately grips rod 12 to hold the mechanism and the brakes in applied position in the manner heretofore fully described. It will be seen that the force tending to move member 11 and brake rod 26 toward the left, i. e., in brake releasing direction, acts to tilt member 14 toward the left and thus enhance the gripping action thereof on rod 12.

To release the locking means for permitting release of the brakes, the driver preferably grasps handle 6 and exerts a pull thereon to relieve the tension exerted on locking member 14 by the brake system and simultaneously depresses button 24. Downward movement of the latter causes the lower, laterally extending portion 21 of rod 22 to engage and move along surface 20 of lever 5 and hence move locking element 14 to non-locking position, as heretofore fully described. Lever 5 may then be manually moved in a clock-wise direction to release the brakes or may be permitted to be thus moved by the usual springs which tend to maintain the brakes in released position.

Although only a single embodiment of the invention has been illustrated and described in detail, it is to be expressly understood that the same is not limited thereto but that various changes, particularly in the design and arrangement of parts illustrated, may be made therein without departing from the spirit and scope of the invention. It is not necessary, for example, that link 18 be U-shaped, and member 11 may be dispensed with, if desired. Also, locking member 14 may be fulcrumed on lever 5 by means of a pivot pin, if desired, in lieu of the slot type of fulcrum illustrated. It will also be evident to those skilled in the art that pivot 10 and fulcrum 16 may be placed at the lower end of lever 5 without departing from the invention.

Other changes of a similar nature will also be apparent. For a definition of the limits of the invention, reference is had primarily to the appended claims.

What is claimed is:

1. The combination with a resistance member of an arcuate element, a pivoted lever, a locking member fulcrumed on said lever and having an opening therethrough for slidably receiving said element, means connecting said resistance member to said lever adjacent the fulcrum for said locking member, whereby the latter is held in gripping engagement with said element, and means for moving said locking member to non-gripping position including a member movable relative to the lever and adapted to engage an angular surface on the latter and a motion transmitting link interposed between said last-named member and said locking member.

2. The combination with a resistance member of an element, a member pivoted intermediate the ends thereof, said member having a recess therein, a unitary locking member freely extending into said recess and having an opening therethrough for slidably receiving said element, and means connecting said resistance member to said pivoted member adjacent said recess whereby said locking member is held in gripping engagement with said element to thereby hold said resistance member against movement in one direction.

3. The combination with a resistance member of a stationary element, a pivoted member having a recess therein, said pivoted member being fulcrumed intermediate the ends thereof and having a handle portion formed therewith, a locking member freely extending into said recess and having an opening therethrough for slidably receiving said element, means connecting said resistance member to said pivoted member adjacent said recess whereby said locking member is held in gripping engagement with said element, and means movably mounted on said pivoted member for moving said locking member to non-gripping position.

4. In apparatus of the class described, an element, a member having an opening therethrough for slidably receiving said element, means for yieldingly holding said member in a position for frictionally gripping said element whereby said member and element are held against relative movement in one direction, and means for moving said member to non-gripping position including a cam surface, means adapted to engage and move along said surface and connecting means between said last-named means and said locking member.

5. In apparatus of the class described, a stationary element, a pivoted lever, a locking member fulcrumed on said lever and having an opening therethrough for slidably receiving said element, resilient means for yieldingly holding said locking member in gripping engagement with said element whereby said lever is held against movement in one direction, means movable relative to said lever in engagement with a cam surface on the latter, and means connecting said last-named means and said locking member whereby the latter may be moved to non-gripping position.

6. The combination with a movable member and means constituting a force tending to move said member in one direction, of an element, a lever pivoted intermediate the ends thereof and provided with a handle, a unitary locking member slidably mounted on said element, said locking member being fulcrumed on said lever for pivotal movement relative thereto, and means connecting said movable member to said lever adjacent the fulcrum for said locking member whereby the latter is held in gripping engagement with said element to hold said movable member against movement by said force.

7. The combination with a movable member and means constituting a force tending to move said member in one direction, of a stationary element, a pivoted lever having a handle formed therewith, a locking member slidably mounted on said element, said locking member being fulcrumed on said lever for pivotal movement relative thereto, means connecting said movable member to said lever adjacent the fulcrum for said locking member whereby the latter is held in gripping engagement with said element to hold said movable member against movement by said force, and manually operable movable means mounted on said lever for moving said locking member to non-gripping position.

8. The combination with a movable member and means constituting a force tending to move said member in one direction, of a stationary element, a pivoted lever, a locking member slidably mounted on said element, said locking member being fulcrumed on said lever for pivotal movement relative thereto, means connecting said movable member to said lever adjacent the fulcrum for said locking member whereby the latter is held in gripping engagement with said element to hold said movable member against movement by said force, means movable relative to said lever in engagement with a cam surface on the latter, and means connecting said last-named means and said locking member whereby the latter may be moved to non-gripping position.

9. In apparatus of the class described, a brake lever having a handle at one end and a cam member at the other end, a stationary supporting frame, said brake lever being pivotally mounted upon said frame at a point intermediate said cam member and said handle, an arcuate element rigidly supported by said frame, a locking plate mounted for limited pivotal and axial movement in a recess provided in said lever, said plate having an opening therein for slidably receiving said arcuate element, resilient means interposed between said plate and said lever normally holding said plate in gripping engagement with said arcuate element, a member mounted on said plate, a rigid rod reciprocally mounted in the handle of said lever and connected to said last-named member, said rod being adapted to engage and move along the surface of the cam member of said lever to release said locking plate from gripping position, and resilient means normally holding said rod inoperative.

10. In apparatus of the class described, a brake lever having a handle at one end and a recess at the other end, a stationary supporting frame, said brake lever being pivotally mounted on said frame intermediate said handle and said recess, an arcuate element rigidly supported by said frame, a locking plate mounted for limited pivotal and axial movement in the recess in said lever, said plate having an opening therein for slidably receiving said arcuate element, resilient means normally holding said plate in gripping engagement with said arcuate element, and means mounted on said handle and connected to said locking plate for moving said plate to non-gripping position.

11. In apparatus of the class described, a stationary element, a pivoted member, a locking member fulcrumed on said pivoted member and having an opening therethrough for slidably receiving said element, resilient means interposed between said pivoted member and said locking member for yieldingly holding the latter in position to grip said element and thereby hold said pivoted member against pivotal movement in one direction, means, including a cam surface, rigidly secured to said pivoted member, and means connected to said locking member, said cam surface being adapted to be engaged by said last named means to move said locking member to non-gripping position.

12. In apparatus of the class described, a brake lever having a handle at one end and a recess at the other end, a stationary supporting frame, said brake lever being pivotally mounted on said frame intermediate said handle and said recess, an arcuate element rigidly supported by said frame, a locking plate pivotally mounted in the recess in said lever, said plate being loosely pivoted for limited axial movement and having an opening therein for slidably receiving said arcuate element, and means including a resilient member normally holding said plate in gripping engagement with said arcuate element, said last named means comprising a member mounted on said handle and connected to said locking plate for moving said plate to non-gripping position.

CHARLES C. STRANGE.